Patented Feb. 13, 1940

2,189,810

UNITED STATES PATENT OFFICE 2,189,810

STABILIZED DIVINYL ETHER

Randolph T. Major, Plainfield, and William L. Ruigh, Princeton, N. J., assignors to Merck & Co., Inc., Rahway, N. J., a corporation of New Jersey No Drawing. Application May 11, 1937, Serial No. 141,928

8 Claims. (Cl. 23—250)

This invention relates to means and compositions for stabilizing divinyl ether for various industrial and medicinal uses.

In Patent No. 2,021,472, November 19, 1935, we have described the physical and chemical properties of true divinyl ether and processes for producing it in highly pure form, which render it useful for many technical purposes, and for use in anesthesia.

The process for producing this pure divinyl ether, as described in the patent identified above, comprises the steps of reacting upon $B_1B^1$-di-halogen-diethyl ether with alkali hydroxide in an autoclave under constant stirring to prevent the formation of any crust of alkali upon the surface of the reaction mixture, using appropriate distillation and condensation means, and passing a stream of ammonia gas throughout the reaction, distilling, and condensing systems during the conduct of the entire process. The product thus obtained is pure divinyl ether, free from aldehyde, ethylene oxide, 1,4-dioxone, β-chlorethyl-vinyl ether, etc., and shows decidedly different properties than the products previously reported as divinyl ether. Thus, while various products which had hitherto been described as divinyl ethers had shown a wide range of boiling points, say, from 34° to 39° C., our new product has been found to be a volatile, colorless liquid boiling at about 28.3±0.3° C. at 760 mm., having a density of $$d_{20°}^{20°} \ 0.774 \text{ and } d_{4°}^{20°} \ 0.773$$

and a refractive index $$N_D^{20°} \ 1.3989$$

These findings together with analyses and molecular weight determinations, clearly distinguish our new material from those described in the old literature, and indicate that it is substantially pure $C_2H_3.O.C_2H_3$.

Based upon the pharmacological studies of Leake and Chen (Proc. Soc. Expr. Biol. and Med. 1930 XXXVIII) of the anesthetic properties of unsaturated ethers, this product was indicated on theoretical grounds to be a promising new anesthetic and especially in view of the fact that it is a highly pure form and contains no injurious by-products such as aldehyde, ethylene oxide, 1,4-dioxone, and β-chlorethyl-vinylether, such as are present in the products prepared according to the old processes. Recent clinical results with our new ether have justified these theoretical conceptions as to relatively low toxicity and anesthetically important physical and chemical properties.

The new product is also well suited for various technical uses. For example, it may be used as a solvent for fats, oils, and waxes, and for their extraction, and as an intermediate in the preparation of various solid and semi-solid glass-like polymers. On account of its definite composition and properties, it is susceptible to more positive and reliable adaptation to its possible uses, as compared with the hitherto known preparations of indefinite and varying composition. These advantages are ascribable to the fact that true divinyl ether contains no higher boiling material and no active foreign material, such as acetaldehyde, which reacts with many compounds.

However, it has been found that this new true divinyl ether is prone to decomposition when it is exposed for a time to atmospheric air, with oxidation to peroxides, aldehydes, and acids, and it also readily polymerizes under conditions of such exposure, especially when in a warm place and in the light.

Such decomposition, deterioration, and polymerization obviously render the ether unfit, not only for anesthetic uses, but for general technical uses as a solvent and otherwise, as well.

In our co-pending application Serial No. 14,438, filed April 3, 1935, and allowed March 6, 1937, issued as Patent No. 2,099,695 on March 23, 1937, we have disclosed a method of stabilizing the pure ether against oxidation and polymerization. The method therein disclosed comprised the addition to the ether of a relatively small quantity of a polyphenol of the group comprising hydroquinone, pyrogallol, p-N-isopropyl-amino-phenol, p-aminophenol, and p-N-methyl-amino-phenol.

The present invention is related to the invention in the co-pending application, and is a continuation-in-part thereto.

We have now found that certain other polyphenols, in addition to those previously disclosed, are also serviceable as negative catalysts for oxidation and polymerization of divinyl ether. Such other polyphenols comprise those which are soluble in the ether to the extent of at least 0.001% and include, for example, such polyphenols as resorcinol, pyrocatechol, phloroglucinol, etc. Of course, such negative catalysts also must be free of other characteristics which would render them unsuitable for the specific intended uses. For example, when the ether is intended for anesthetic use, the anti-oxidant and anti-polymerizant should be non-volatile and relatively non-toxic. For technical uses of the ether, the chosen inhibitor must be chemically inert with respect to the materials with which it is to be used.

Such limitations and appropriate selections will be readily understood, according to the nature of the materials under consideration.

The practical application of the process for the production of a stabilized divinyl ether comprises the solution of the given appropriate inhibitor in approximately from one part to 100 parts, to as low as one part to 100,000 parts, of the ether. Obviously, the inhibiting action of these several agents is in general more certain and positive with the relative increase in quantity within reasonable limits, and the specific inhibitor selected, as well as the quantities to be used, may be conveniently modified to adapt the process to the special requirements, as indicated.

It is desirable, also, especially in the case of divinyl ether stabilized in the manner indicated when intended for general anesthetic use, to add a quantity of an anti-freeze agent which, for such uses, should be non-toxic, soluble in the divinyl ether and in water, and volatile in the mixture with the ether. Such an agent is available, for example, in ethyl alcohol. It has been found that a quantity of about 3.5% by volume is generally sufficient. The quantity of ethyl alcohol for use as an effective anti-freeze agent with the vinyl ether has been found to range from about 1.5% to about 5%. Excessive quantities of alcohol are to be avoided to prevent the collection of unevaporated alcohol on the ether cone or mask.

Further, in order to afford still greater protection of the ether from decomposition or deterioration, it may be desirable that the stabilized ether be sealed in vacuo or in an atmosphere of an inert gas such as nitrogen, and, if required this may be done in accordance with known or convenient methods.

We claim as our invention:—

1. Divinyl ether stabilized with resorcinol.
2. Divinyl ether stabilized with pyrocatechol.
3. Divinyl ether stabilized with phloroglucinol.
4. The method of stabilizing divinyl ether which comprises dissolving therein about one part of resorcinol to from about 100 to 100,000 parts of the ether.
5. The method of stabilizing divinyl ether which comprises dissolving therein about one part of pyrocatechol to from about 100 to 100,000 parts of the ether.
6. The method of stabilizing divinyl ether which comprises dissolving therein about one part of phloroglucinol to from about 100 to 100,000 parts of the ether.
7. Divinyl ether stabilized with a polyphenol selected from the group consisting of resorcinol, pyrocatechol, and phloroglucinol.
8. The method of stabilizing divinyl ether which comprises dissolving therein about one part of a polyphenol selected from the group consisting of resorcinol, pyrocatechol, and phloroglucinol in from about 100 to 1000 parts of ether.

RANDOLPH T. MAJOR.
WILLIAM L. RUIGH.